(12) United States Patent
Suzuki

(10) Patent No.: US 7,075,734 B2
(45) Date of Patent: Jul. 11, 2006

(54) ZOOM LENS SYSTEM

(75) Inventor: Kenzaburo Suzuki, Kanagawa-ken (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/128,373

(22) Filed: May 13, 2005

(65) Prior Publication Data

US 2005/0207023 A1 Sep. 22, 2005

Related U.S. Application Data

(63) Continuation of application No. 10/742,894, filed on Dec. 23, 2003, now Pat. No. 6,909,846.

(30) Foreign Application Priority Data

Dec. 25, 2002 (JP) .............................. 2002-374844

(51) Int. Cl.
*G02B 15/14* (2006.01)
(52) U.S. Cl. .................................................... 359/691
(58) Field of Classification Search ......... 359/676–692
See application file for complete search history.

(56) References Cited

U.S. PATENT DOCUMENTS

| | | | | |
|---|---|---|---|---|
| 6,081,389 | A | 6/2000 | Takayama et al. | 359/680 |
| 6,219,190 | B1* | 4/2001 | Itoh | 359/692 |
| 6,542,301 | B1* | 4/2003 | Fujibayashi | 359/565 |
| 6,618,210 | B1 | 9/2003 | Noguchi et al. | 359/689 |
| 6,621,642 | B1 | 9/2003 | Hagimori et al. | 359/682 |
| 6,643,072 | B1* | 11/2003 | Mihara | 359/686 |
| 2003/0076591 | A1 | 4/2003 | Ohmori et al. | 359/566 |

FOREIGN PATENT DOCUMENTS

| | | |
|---|---|---|
| JP | 11-52235 | 2/1999 |
| JP | 11-52237 | 2/1999 |
| JP | 2000-221397 | 8/2000 |

OTHER PUBLICATIONS

"Introduction to Diffractive Optical Elements," Supervised by Optical Design Study Group in the Optical Society of Japan, OPTRONICS, 1997 (with English translation).

* cited by examiner

*Primary Examiner*—Scott J. Sugarman
*Assistant Examiner*—M. Hasan
(74) *Attorney, Agent, or Firm*—Miles & Stockbridge P.C.

(57) ABSTRACT

A zoom lens system having an exit pupil far away from the image plane, zoom ratio of about three, and in particular having compactness and high optical performance includes, in order from an object, a first lens group having negative refractive power, an aperture stop, a second lens group having positive refractive power, and a third lens group having positive refractive power. When zooming from a wide-angle end state to a telephoto end state, the first and second lens groups are moved and the third lens group is fixed such that a distance between the first lens group and the second lens group varies, and a distance between the second lens group and the third lens group increases. The second lens group is composed of four lenses or less and includes a diffractive optical surface formed on a lens surface except the most object side lens surface.

17 Claims, 9 Drawing Sheets

ZOOM LENS SYSTEM

CROSS-REFERENCE TO RELATED APPLICATION

This application is a continuation of application Ser. No. 10/742,894 filed Dec. 23, 2003 now U.S. Pat. No. 6,909,846.

INCORPORATION BY REFERENCE

The disclosures of the following priority application is herein incorporated by reference:

Japanese Patent Application No. 2002-374844 filed Dec. 25, 2002.

BACKGROUND OF THE INVENTION

1. Field of the Invention

The present invention relates to a zoom lens system suitable for video cameras, electronic still cameras and the like using a solid state imaging device.

2. Description of Related Art

As increasing trend of video cameras and electronic still cameras to be compact, a request for zoom lens systems to be compact has become strong. Recently, a request for a zoom lens system having a function of varying zoom ratio has increasingly been strong. Moreover, as an increasing request for high imaging quality, the number of pixels of an imaging device has become large resulting in a strong request for high optical performance. As a means for accomplishing these requests, a zoom lens system using a diffractive optical element has been known.

For example, a zoom lens system consisting of, in order from an object, negative-positive, two lens groups, having a diffractive optical surface on at least one lens surface of a first lens group or a second lens group was disclosed in Japanese Patent Application Laid-Open No. 11-52235. Moreover, a zoom lens system consisting of, negative-positive-positive, three lens groups having a diffractive optical surface in any one of the three groups was disclosed in Japanese Patent Application Laid-Open No. 11-52237. Furthermore, a zoom lens system consisting of, negative-positive-positive, three lens groups having a diffractive optical surface in the second lens group was disclosed in Japanese Patent Application Laid-Open No. 2000-221397.

However, in any one of zoom lens systems disclosed in Japanese Patent Application Laid-Open Nos. 11-52235 and 11-52237, both optical performance and compactness were not sufficient. In a zoom lens system disclosed in Japanese Patent Application Laid-Open No. 2000-221397, since a diffractive optical surface arranged in the second lens group was introduced at a cemented surface, it was difficult to manufacture.

SUMMARY OF THE INVENTION

The present invention is made in view of the aforementioned problems and has an object to provide a zoom lens system suitable for video cameras, electronic still cameras and the like using a solid state imaging device having an exit pupil far away from the image plane, zoom ratio of about 3, and in particular having compactness and high optical performance by using a diffractive optical element.

According to one aspect of the present invention, a zoom lens system includes, in order from an object, a first lens group having negative refractive power, an aperture stop, a second lens group having positive refractive power, and a third lens group having positive refractive power. When the state of lens group positions varies from a wide-angle end state to a telephoto end state, the first lens group and the second lens group are moved and the third lens group is fixed such that a distance between the first lens group and the second lens group varies, and a distance between the second lens group and the third lens group increases. The second lens group is composed of four lenses or less. The second lens group includes a diffractive optical surface formed on a lens surface except the most object side lens surface. The following conditional expression (1) is satisfied:

$$0.2 < C/fw < 2.0 \tag{1}$$

where C denotes the effective diameter of the diffractive optical surface, and fw denotes the focal length of the zoom lens system in the wide-angle end state.

In one preferred embodiment of the present invention, the following conditional expression (2) is satisfied:

$$0 \leq L/L2 < 1.0 \tag{2}$$

where L denotes a distance along the optical axis between the most image side lens surface of the second lens group and the diffractive optical surface, and L2 denotes the total lens length of the second lens group (not including the aperture stop).

In one preferred embodiment of the present invention, the diffractive optical surface is formed on a lens surface that faces the air, and the following conditional expression (3) is satisfied:

$$0 \leq |fw/ra| < 0.4 \tag{3}$$

where ra denotes a radius of curvature of the lens surface on which the diffractive optical surface is formed.

In one preferred embodiment of the present invention, the following conditional expression (4) is satisfied:

$$0.2 < f3/fw < 15.0 \tag{4}$$

where f3 denotes the focal length of the third lens group.

Other feature and advantages according to the present invention will be readily understood from the detailed description of the preferred embodiments in conjunction with the accompanying drawings.

DESCRIPTION OF THE PREFERRED EMBODIMENTS

Figure 1:
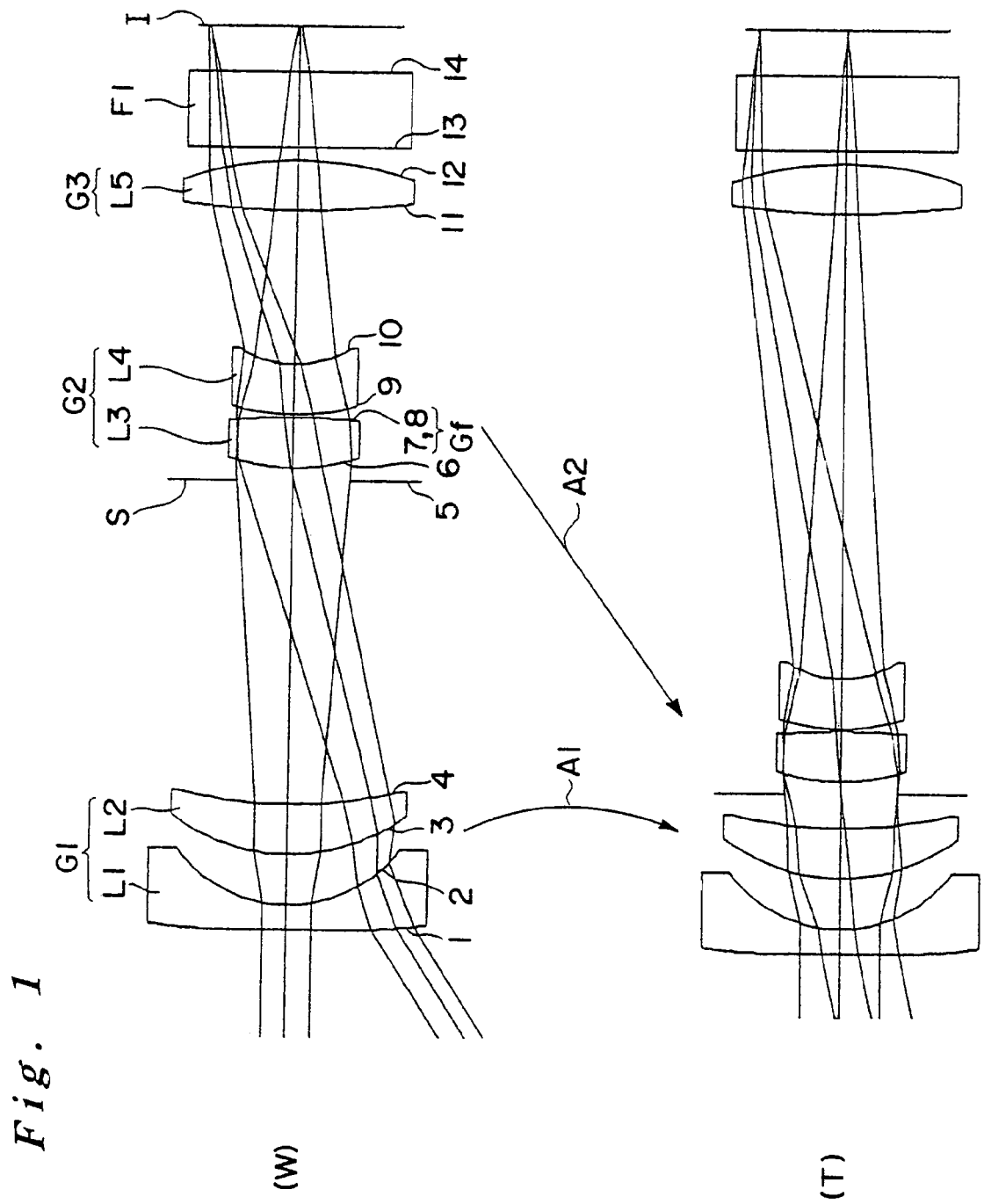
FIG. 1 is a diagram showing a lens construction of a zoom lens system according to Example 1 of the present invention.

Preferred embodiments of a zoom lens system according to the present invention is explained below. The zoom lens system according to the present invention is composed of, in order from an object, a first lens group G1 having negative refractive power, an aperture stop, a second lens group G2 having positive refractive power, and a third lens group G3 having positive refractive power. Since the zoom lens system has, in order from the object, a negative-positive-positive power arrangement, the exit pupil can be located far away from the image plane. Moreover, to include the aperture stop in the second lens group G2 is indispensable construction for correcting various aberrations and separating the aperture stop far away from the image plane. If the aperture stop is positioned in the third lens group G3, the exit pupil cannot sufficiently be separated from the image plane. Since the third lens group G3 is located at the nearest position to the image plane, the third lens group G3 in particular is very effective to separate the aperture stop far away from the image plane. Accordingly, the zoom lens system as of the present invention is suitable for cameras using a solid state imaging device.

In the present invention, by means of introducing a lens surface having diffractive effect (hereafter called a diffractive optical surface), chromatic aberration, in particular, could be corrected satisfactory. Moreover, flare that has been a characteristic problem of a diffractive optical element was reduced. As a result, the inventor found it possible to accomplish superb optical performance. This is explained below in detail.

Generally, there have been known three kinds of actions to deflect a light ray such as refraction, reflection, and diffraction. In the present invention, the diffractive optical surface is a lens surface on which a light ray is deflected by using a diffraction effect to be able to obtain various optical effects. Specifically, the diffractive optical surface has a lot of merits such that it can produce negative dispersion and can easily be compact. In particular, it has been known to be extremely effective to correct chromatic aberration. By the way, these diffractive optical elements are shown in detail in "*Introduction to Diffractive Optical Elements*", supervised by The Optical Society of Japan, (OPTRONICS, 1997).

In the zoom lens system according to the present invention, it is preferable that the angle to incident to the diffractive optical element is as small as possible like general optical systems having a diffractive optical surface. This is because when the incident angle becomes large, flare tends to be produced on the diffractive optical surface to degrade optical performance. Accordingly, in the zoom lens system according to the present invention, in order to suppress the effect of flare to obtain superb optical performance, the incident angle of the light ray to the diffractive optical surface should be 10 degrees or less. Although the diffractive optical surface can be formed on any lens surface of the zoom lens system as long as these conditions are satisfied, the most object side lens surface of the second lens group in the present invention is not suitable because the incident angle of the light ray is more than 10 degrees. Accordingly, the inventor found it preferable to arrange the diffractive optical surface at any lens surfaces except the most object side lens surface. In order to bring the effect of the present invention into full play, it is preferable to set the incident angle 5 degrees or less.

The zoom lens system according to the present invention is explained below in detail with reference to the explanation of conditional expressions. In the zoom lens system according to the present invention, the following conditional expression (1) is satisfied:

$$0.2 < C/fw < 2.0 \tag{1}$$

where C denotes the effective diameter of the diffractive optical surface, and fw denotes the focal length of the zoom lens system in a wide-angle end state.

Conditional expression (1) defines an appropriate range of the suitable effective diameter C of the lens having the diffractive optical surface. When the ratio C/fw is equal to or exceeds the upper limit of conditional expression (1), the effective diameter becomes extremely large to become difficult to manufacture the diffractive optical surface, so that manufacturing cost increases. Moreover, harmful light rays from outside tend to enter to cause flare and degradation of imaging quality. On the other hand, when the ratio C/fw is equal to or falls below the lower limit of conditional expression (1), the effective diameter C of the lens having the diffractive optical element becomes excessively small causing strong tendency to make the grating pitch of the diffractive optical surface smaller, so that manufacturing the diffractive optical surface becomes difficult causing increase in manufacturing cost and production of flare becomes large causing degradation of imaging quality. Moreover, peripheral quantity of light tends to become insufficient, so that it is not desirable. In order to bring the effect of the present invention into full play, it is preferable to set the upper limit of conditional expression (1) to 0.9. The lower limit of conditional expression (1) is preferably set to 0.5.

In the zoom lens system according to the present invention, the following conditional expression (2) is satisfied:

$$0 \leq L/L2 < 1.0 \tag{2}$$

where L2 denotes the thickness of the second lens group (not including the aperture stop), and L denotes a distance along the optical axis between the most image side lens surface and the diffractive optical surface.

Conditional expression (2) defines an appropriate range of the position of the lens on which the diffractive optical surface is formed. When the ratio L/L2 is equal to or exceeds the upper limit of conditional expression (2), the diffractive optical surface becomes extremely close to the aperture stop causing inconvenience upon assembling into lens barrel, and the incident angle of the light ray incident to the diffractive optical surface becomes excessively large causing production of flare, so that it is undesirable. In order to bring the effect of the present invention into full play, it is preferable to set the upper limit of conditional expression (2) to 0.9.

In the zoom lens system according to the present invention, the following conditional expression (3) is satisfied:

$$0 \leq |fw/ra| < 0.4 \tag{3}$$

where ra denotes a radius of curvature of the lens on which the diffractive optical surface is formed.

Conditional expression (3) defines an appropriate range of the radius of curvature ra of the lens on which the diffractive optical surface is formed. When the ratio |fw/ra| is equal to or exceeds the upper limit of conditional expression (3), the radius of curvature ra of the diffractive optical surface becomes excessively small causing difficulty in manufacturing the diffractive optical surface and causing excessive production of coma and curvature of field. By the way, when the diffractive optical surface is formed on a plane surface, ra becomes infinity, so conditional expression (3) is |fw/ra|=0.

In the zoom lens system according to the present invention, the following conditional expression (4) is satisfied:

$$0.2 < f3/fw < 15.0 \quad (4)$$

where f3 denotes the focal length of the third lens group.

Conditional expression (4) defines an appropriate range of the focal length of the third lens group f3. When the ratio f3/fw is equal to or exceeds the upper limit of conditional expression (4), it becomes difficult to separate the exit pupil sufficiently from the image plane. On the other hand, when the ratio f3/fw is equal to or falls below the lower limit of conditional expression (4), it becomes difficult to make the zoom lens system compact. In order to bring the effect of the present invention into full play, it is preferable to set the upper limit of conditional expression (4) to 10.0. The lower limit of conditional expression (4) is preferably set to 1.5. Incidentally, focusing can be carried out by moving the third lens group to the object.

In the zoom lens system according to the present invention, the following conditional expression (5) is preferably satisfied:

$$-3 < (r1+r2)/(r2-r1) < 0 \quad (5)$$

where r1 denotes the radius of curvature of the object side surface of the negative lens locating to the most object side of the first lens group, and r2 denotes the radius of curvature of the image side surface of the negative lens locating to the most object side of the first lens group.

Conditional expression (5) defines an appropriate range of the negative lens locating to the most object side of the first lens group. When the ratio (r1+r2)/(r2−r1) is equal to or falls below the lower limit of conditional expression (5), off-axis aberrations such as astigmatism and lateral chromatic aberration become large, so that it is undesirable. On the other hand, when the ratio is equal to or exceeds the upper limit of conditional expression (5), it becomes difficult to carry out polishing, centering and edging the lens resulting in an increase in manufacturing cost. In order to bring the effect of the present invention into full play, it is preferable to set the upper limit of conditional expression (5) to −0.8. The lower limit of conditional expression (5) is preferably set to −2.

In the zoom lens system according to the present invention, the following conditional expression (6) is preferably satisfied:

$$0.02 < \Delta N \quad (6)$$

where $\Delta N$ denotes the difference of refractive index of the positive lens locating to the most object side from that of the negative lens locating to the most image side of the second lens group.

In a zoom lens system having long back focal length relative to the maximum image height like the present invention, the position of on-axis ray passing through the image side lens group tends to leave significantly away from the optical axis, so that it is difficult to correct on-axis aberrations. In the zoom lens system according to the present invention, by means of setting the value $\Delta N$, which is the difference of refractive index of lenses locating in the second lens group, the inventor found it possible to correct the above-described on-axis aberration preferably. In this case, it is preferable that the refractive index of the positive lens is higher than that of the negative lens in the second lens group. When the value $\Delta N$ is equal to or falls below the lower limit of conditional expression (6), spherical aberration becomes difficult to correct causing unable to obtain better optical performance, and Petzval sum tends to move to negative, so that it is undesirable.

Incidentally, when a diffractive optical surface is formed at cemented surface, the height of the diffraction grating becomes large to tend to produce flare, so the diffractive optical surface is preferably formed on a lens surface exposing to the air. Moreover, in order to correct various aberrations more preferably, it is desirable that the second lens group includes a cemented lens constructed by a biconvex lens cemented by a biconcave lens.

The most object side lens of the second lens group is preferably a biconvex lens. In addition, it is preferable that a diffractive optical surface is formed on the image side surface of the biconvex lens or the image side surface of the most image side lens of the second lens group. When a diffractive optical surface is formed on the image side surface of the most image side lens, the latter case, the object side surface of the lens is preferably a convex surface. Regardless of applying the diffractive optical surface, the most image side surface of the second lens group G2 is preferably a concave surface in consideration of correction of various aberrations.

The first lens group is preferably composed of a negative lens having a convex surface facing to the object and a positive lens. In order to be compact, the second lens group is preferably composed of four lenses or less, and the third lens group is preferably composed of two lenses or less.

The following conditional expression (7) is preferable satisfied:

$$0.3 < |f2/f1| < 1.0 \quad (7)$$

where f1 denotes the focal length of the first lens group and f2 denotes the focal length of the second lens group.

Conditional expression (7) defines an appropriate range of the power distribution of the first lens group and the second lens group. When the ratio |f2/f1| is out of the scope of conditional expression (7), aberration balance tends to lose, so it becomes difficult to accomplish compactness.

The diffractive optical surface is preferably formed on a surface of a lens made of a glass material having Abbe number vd of 65 or less. This is because the diffraction grating is easy to manufacture allowing to obtain superb optical performance.

In view of making it easy to manufacture upon forming a diffractive optical surface on a lens surface, the diffractive optical surface preferably has a grating structure rotationally symmetrical with the optical axis such as a Fresnel zone plate. The grating structure can be manufactured as manufacturing an ordinary aspherical surface by means of fine grinding or glass molding. Moreover, a thin resin layer is formed on the lens surface, and the grating configuration may be formed on the resin layer. Furthermore, the diffraction grating is not limited to a simple single structure, it may be multi-layered structure accumulating a plurality of single layers. By means of a multi-layered-structure diffraction grating, spectral characteristic and angular characteristic of diffraction efficiency can be much more improved.

Moreover, the diffractive optical surface may be formed on an aspherical surface that is formed as a refractive surface by means of Kinoform or multi-level-binary layer having diffractive effect. Further explanation is described below.

Generally, when an aspherical surface is formed by glass molding method, at first a mold is manufactured and then a lot of replicas on which the shape of the mold is replicated are formed at a low cost with high precision. Accordingly, in order to form a diffractive optical surface on an aspherical surface formed as a refractive surface, Kinoform layer or multi-leveled-binary layer may just be added on the mold. The method does not cause much increase in manufacturing cost or processing time, so it is highly useful. In particular, the method adding binary layers on a lens surface is similar to that for manufacturing a semiconductor chip, so it is further useful. It also may be possible that a Kinoform shape or a binary shape is formed on a lens surface with a plane or a spherical surface by adding a clear thin resin layer on the surface.

The zoom lens system according to the present invention can be constructed as a vibration reduction control lens system that is combined with a vibration detector for detecting vibration of an imaging lens, a vibration controller for determining an appropriate vibration correction amount on the basis of a signal from the vibration detector and a controller for controlling a sequence of a camera movement, and a driver for moving the vibration reduction lens group on the basis of the vibration correction amount determined by the vibration controller. In this case, it is preferable that the vibration reduction lens group is to be a small lens group or a portion of the lens group constructing to be shifted perpendicular to the optical axis. It is needless to say that the further preferable optical performance can be obtained by using an aspherical lens, a graded index lens, and the like in addition to respective lenses composing the front teleconverter lens according to the present invention.

Figure 4:
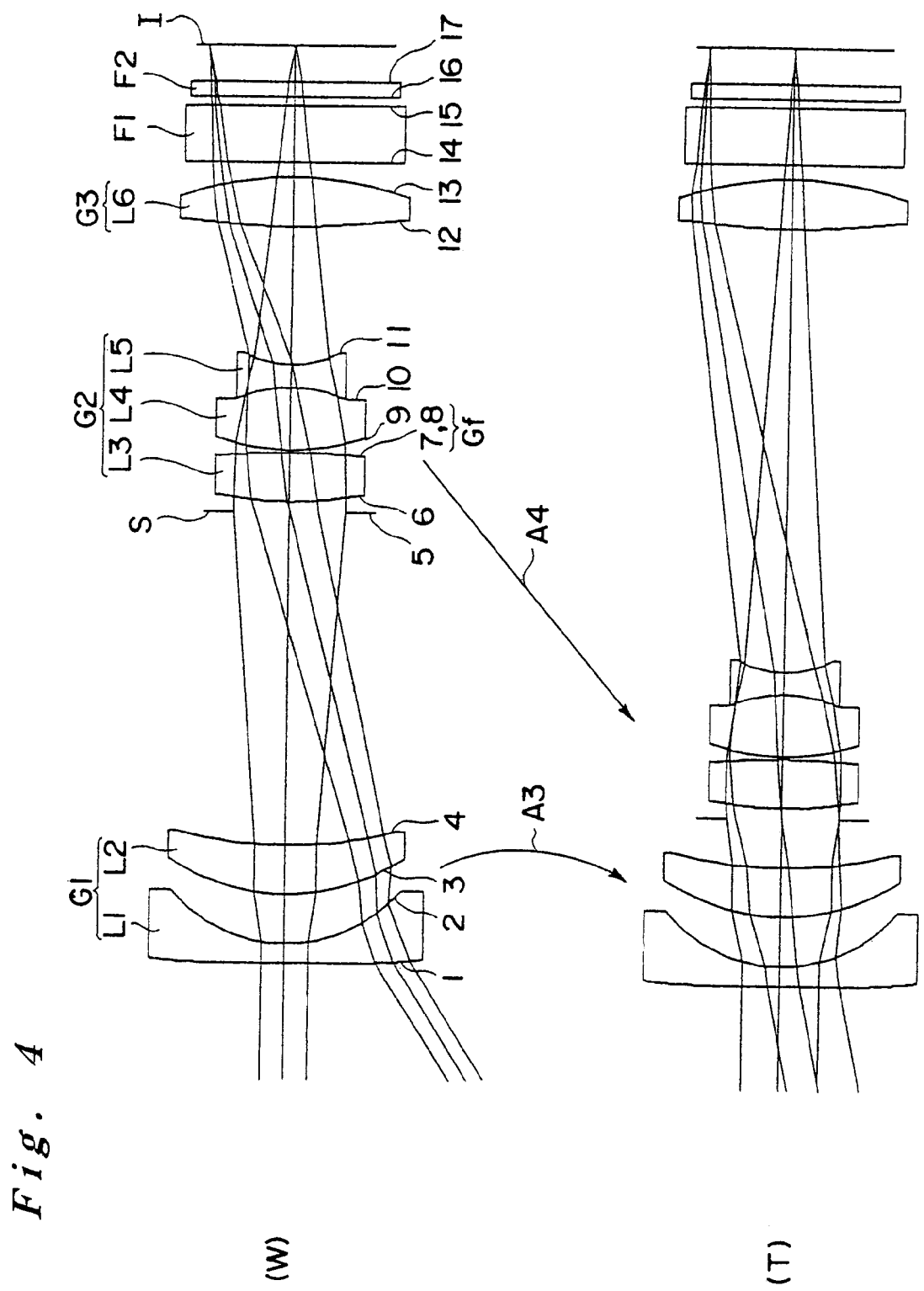
FIG. 4 is a diagram showing a lens construction of a zoom lens system according to Example 2 of the present invention.
Figure 7:
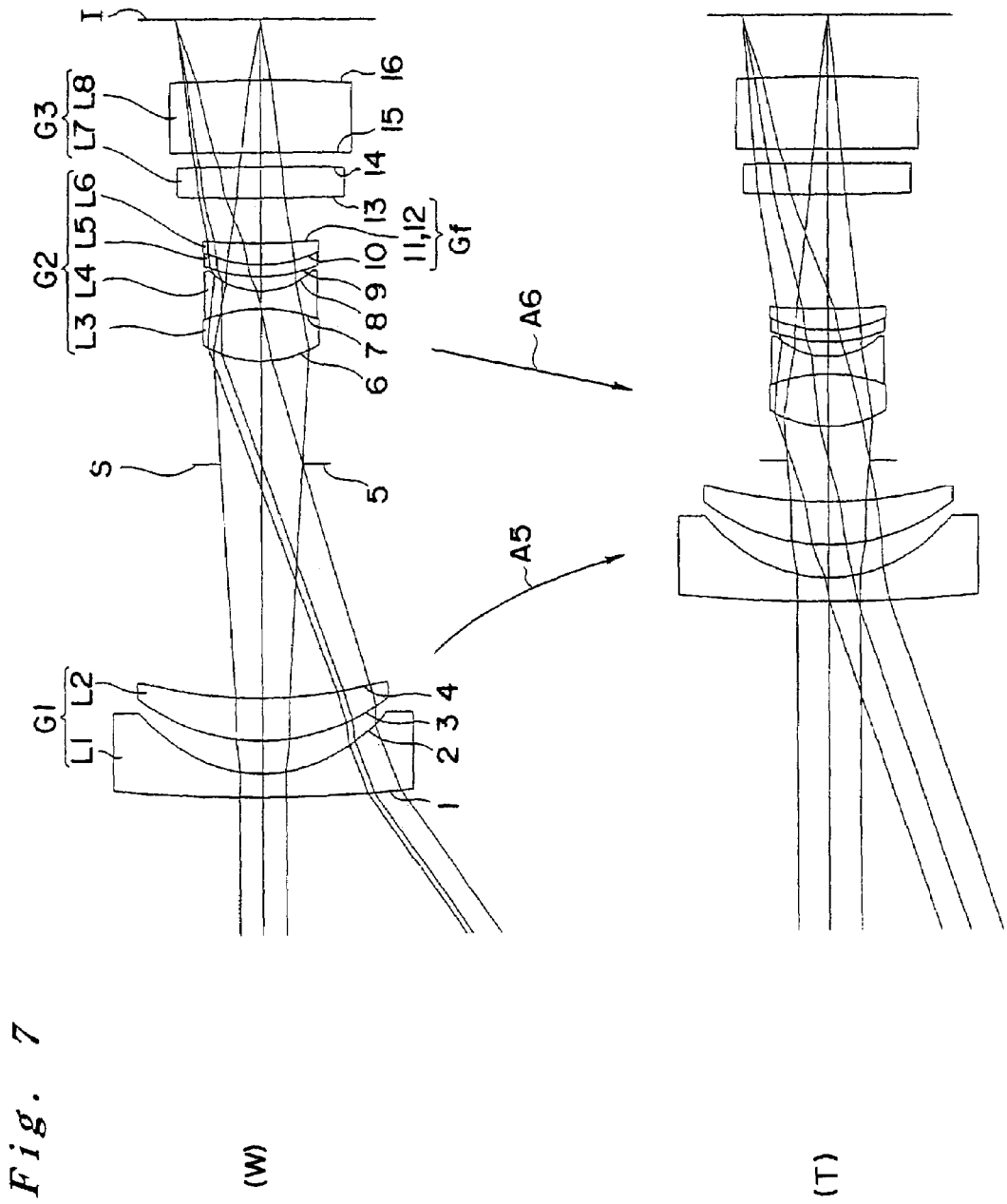
FIG. 7 is a diagram showing a lens construction of a zoom lens system according to Example 2 of the present invention.

FIGS. 1, 4, and 7 are drawings showing constructions of zoom lens systems according to respective Examples of the present invention together with zooming trajectories from a wide-angle end state (W) to a telephoto end state (T). Each Example according to the present invention is explained below with respect to accompanying drawings. In each Example, the zoom lens system according to the present invention is composed of, in order from an object, a first lens group G1 having negative refractive power, an aperture stop, a second lens group G2 having positive refractive power, and a third lens group G3 having positive refractive power. When the state of lens group positions varies from the wide-angle end state (W) to the telephoto end state (T), the first lens group G1 and the second lens group G2 are moved, and the third lens group G3 is fixed such that a distance between the first lens group G1 and the second lens group G2 decreases, and a distance between the second lens group G2 and the third lens group G3 increases. The second lens group G2 is composed of four (4) lens or less.

In each Example, the phase difference is calculated by means of an ordinary refractive index and a ultra-high index method that uses aspherical expressions (8) and (9) mentioned later. The ultra-high index method uses definite equivalence between the aspherical expression and the grating pitch of the diffractive optical surface. In each Example, the diffractive optical surface is represented as data of the ultra-high index method, in other words, coefficients of aspherical expressions (8) and (9). In each Example, aberration calculation is carried out at d-line, g-line, C-line, and F-line. The wavelength and the particular value of refractive index set relative to each spectral line, d-line, g-line, C-line, and F-line, are shown in Table 1.

TABLE 1

| | wave length | refractive index |
|---|---|---|
| d-line | 587.562 nm | 10001 |
| g-line | 435.835 | 7418.6853 |
| C-line | 656.273 | 11170.4255 |
| F-line | 486.133 | 8274.7311 |

In each Example, an aspherical surface is represented by the following expressions (8) and (9):

$$x=(y^2/r)/(1+(1-\kappa(y^2/r^2))^{1/2})+C_2y^2+C_4y^4+C_6y^6+C_8y^8+C_{10}y^{10} \quad (8)$$

$$R=1/((1/r)+2C_2) \quad (9)$$

where y denotes ray height (incident height) perpendicular to the optical axis, x denotes sag amount that is the distance along the optical axis between tangent plane at the vertex of the aspherical surface and the aspherical surface at height y, r denotes a reference radius of curvature, R denotes a paraxial radius of curvature, $\kappa$ denotes the conical coefficient, $C_2$ denotes the second order aspherical coefficient, $C_4$ denotes the 4th order aspherical coefficient, $C_6$ denotes the 6th order aspherical coefficient, $C_8$ denotes the 8th order aspherical coefficient, $C_{10}$ denotes the 10th order aspherical coefficient.

Incidentally, the ultra-high index method used in each Example of the present invention is shown in detail in the aforementioned "*Introduction to a Diffractive Optical Element*", supervised by The Optical Society of Japan, (OPTRONICS, 1997).

EXAMPLE 1

Example 1 according to the present invention is explained below with reference to FIGS. 1 through 3. FIG. 1 is a diagram showing a lens construction of a zoom lens system according to Example 1 of the present invention together with the zooming trajectory of each lens group upon zooming from the wide-angle end state (W) to the telephoto end state (T).

In the zoom lens system shown in FIG. 1, the first lens group is composed of, in order from the object, a negative meniscus lens L1 having an aspherical surface facing to the object, and a positive meniscus lens L2 having a convex surface facing to the object. The second lens group G2 is composed of, in order from the object, an aperture stop S, a biconvex lens L3 having an aspherical surface facing to the object and a diffractive optical surface formed on the image side surface, and a negative meniscus lens L4 having a convex surface facing to the object. The third lens group G3 is composed of a biconvex lens L5 having an aspherical surface facing to the object.

By the way, the aperture stop S is arranged in the vicinity of the second lens group G2 between the first lens group G1 and the second lens group G2, and is moved with the second lens group G2 upon zooming. An optical filter F1 is positioned to the image side of the third lens group G3, and fixed together with the third lens group G3.

Zooming from the wide-angle end state (W) to the telephoto end state (T) is carried out by moving each of the first lens group G1 and the second lens group G2. In Example 1, the first lens group G1 and the second lens group G2 are moved as shown by arrows A1 and A2, respectively, in FIG. 1. The third lens group G3 is fixed.

Various values associated with Example 1 of the present invention shown in FIG. 1 are listed in Table 2. The left most column of [Lens Data] in Table 2 is the surface number. Surface numbers 1 through 14 in Table 2 correspond to the reference number 1 through 14 in FIG. 1. In Table 2, "r" denotes a radius of curvature of a lens surface (a radius of curvature of at the vertex in the case of an aspherical surface), "d" denotes a distance to an adjacent lens surface, "nd" denotes refractive index at d-line, "ng" denotes refractive index at g-line, "nC" denotes refractive index at C-line, "nF" denotes refractive index at F-line.

In Table 2, surface number 5 is the aperture stop S. The distance d4 (surface distance from the surface number 4 to the surface number 5) shown in surface number 4 and the distance d10 (surface distance from the surface number 10 to the surface number 11) shown in surface number 10 vary upon zooming. Similarly, the focal length f and f-number FNO of the zoom lens system also vary upon zooming. These values varying upon zooming are listed blow in the wide-angle end state (W) and the telephoto end state (T). Various values in accordance with conditional expressions (1) through (7) are listed below.

In Table 2, an aspherical surface is expressed with "*" attached to the right side of the surface number. In Example 1, surface numbers 7 and 8 are the diffractive optical surface Gf. Accordingly, the lens L3 in FIG. 1 corresponds to a lens (diffractive optical element) on which a diffractive optical surface Gf is formed. In surface numbers 7 and 8, various values of the diffractive optical surface Gf are shown by using the ultra-high index method. In the case of $C_2=0$, denotation is omitted. The above-described explanation regarding table is the same as each Example shown below.

TABLE 2

[Lens Data]

|     | r | d | nd | ng | nC | nF |
|-----|---|---|----|----|----|-----|
| 1*  | 278.40890 | 0.40000 | 1.834810 | 1.859530 | 1.828970 | 1.848510 |
| 2   | 2.18598 | 0.80000 | 1.000000 | | | |
| 3   | 3.03431 | 0.80000 | 1.805180 | 1.847290 | 1.796110 | 1.827770 |
| 4   | 7.19810 | d4 | 1.000000 | | | |
| 5   | | 0.20000 | Aperture Stop S | | | |
| 6*  | 3.03744 | 0.80000 | 1.772500 | 1.791970 | 1.767800 | 1.783370 |
| 7   | −12.63804 | 0.00000 | 10001 | 7418.6853 | 11170.4255 | 8274.7311 |
| 8*  | −12.63804 | 0.05000 | 1.000000 | | | |
| 9   | 3.49472 | 0.80000 | 1.720470 | 1.747210 | 1.714360 | 1.735110 |
| 10  | 1.64370 | d10 | 1.000000 | | | |
| 11* | 10.36775 | 0.80000 | 1.583130 | 1.595220 | 1.580150 | 1.589930 |
| 12  | −5.41266 | 0.20000 | 1.000000 | | | |
| 13  | ∞ | 1.20000 | 1.544370 | 1.553700 | 1.541900 | 1.549620 |
| 14  | ∞ | 0.72975 | 1.000000 | | | |

[Aspherical Surface Data]

Surface Number: 1

| κ | $C_4$ | $C_6$ | $C_8$ | $C_{10}$ |
|---|-------|-------|-------|----------|
| 1.0000 | $4.20800 \times 10^{-3}$ | $1.48870 \times 10^{-4}$ | $-1.18730 \times 10^{-4}$ | $1.80070 \times 10^{-5}$ |

Surface Number: 6

| κ | $C_4$ | $C_6$ | $C_8$ | $C_{10}$ |
|---|-------|-------|-------|----------|
| −0.9643 | $-4.80590 \times 10^{-3}$ | $7.99720 \times 10^{-3}$ | $-7.39210 \times 10^{-3}$ | $2.25930 \times 10^{-3}$ |

Surface Number: 8

| κ | $C_2$ | $C_4$ | $C_6$ | $C_8$ | $C_{10}$ |
|---|-------|-------|-------|-------|----------|
| 1.0000 | $-1.01490 \times 10^{-6}$ | $-1.05050 \times 10^{-7}$ | $-1.59370 \times 10^{-7}$ | $-1.99370 \times 10^{-8}$ | $1.41220 \times 10^{-7}$ |

Surface Number: 11

| κ | $C_4$ | $C_6$ | $C_8$ | $C_{10}$ |
|---|-------|-------|-------|----------|
| 16.8196 | $-7.18000 \times 10^{-3}$ | $1.06000 \times 10^{-3}$ | $-1.73950 \times 10^{-4}$ | $-1.23240 \times 10^{-5}$ |

[Variable Distance upon Zooming]

|     | Wide-angle (W) | Telephoto (T) |
|-----|----------------|----------------|
| f   | 2.38 | 6.71 |
| FNO | 2.97 | 5.38 |
| d4  | 5.14929 | 0.53650 |
| d10 | 2.44306 | 7.37249 |

[Values for Conditional Expressions]

C = 1.89
fw = 2.37599

TABLE 2-continued

L = 0.85
L2 = 1.65
ra = −12.63804
f1 = −5.54360
f2 = 4.39149
f3 = 6.21438
r1 = 278.4089
r2 = 2.18598
(1) C/fw = 0.795458
(2) L/L2 = 0.515152
(3) |fw/ra| = 0.188003
(4) f3/fw = 2.615491
(5) (r1 + r2)/(r2 − r1) = −1.01583
(6) ΔN = 0.05203
(7) |f2/f1| = 0.792173

As shown above, in Example 1, all conditional expressions (1) through (7) are satisfied.

Figure 2:
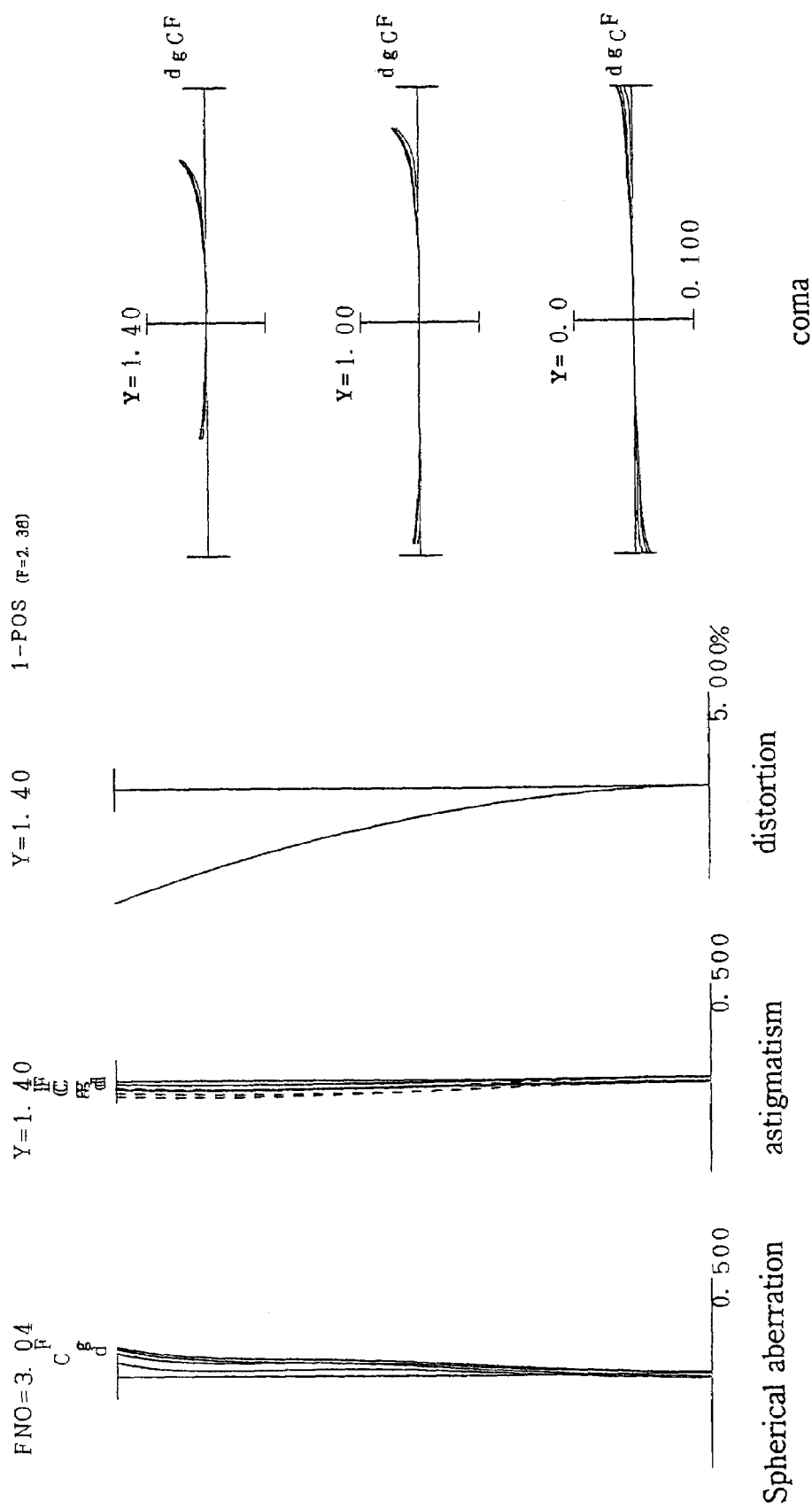
FIG. 2 is graphs showing various aberrations according to Example 1 of the present invention in the wide-angle end state.
Figure 3:
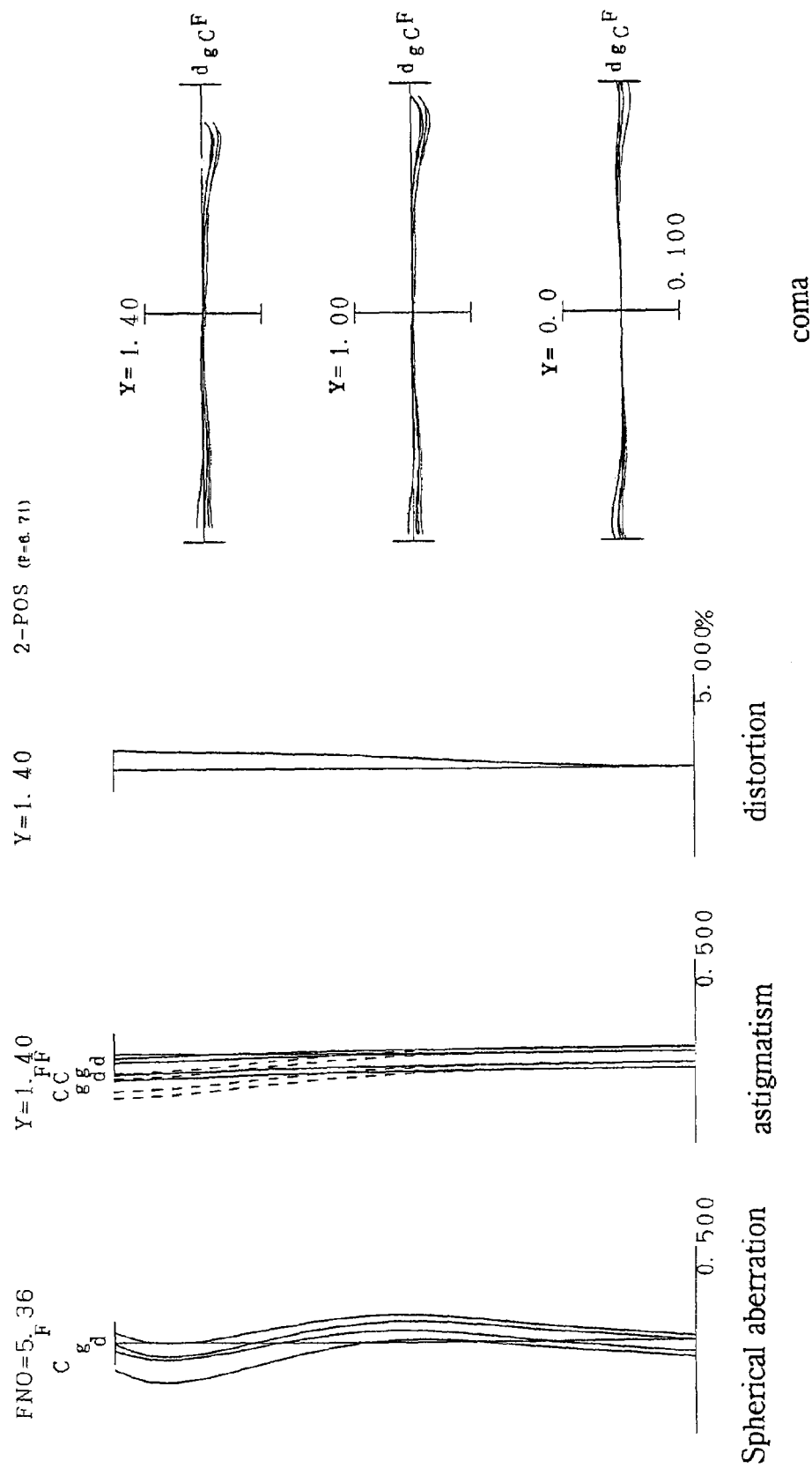
FIG. 3 is graphs showing various aberrations according to Example 1 of the present invention in the telephoto end state.

FIGS. 2 and 3 are graphs showing various aberrations according to Example 1. FIG. 2 shows aberrations in the wide-angle end state (W). FIG. 3 shows aberrations in the telephoto end state (T). In graphs for various aberrations, FNO denotes the f-number. Y denotes an image height. D denotes d-line, G denotes g-line, C denotes C-line, and F denotes F-line. In the diagrams showing spherical aberration, FNO denotes f-number with respect to the maximum aperture. In the diagrams showing astigmatism and distortion, Y denotes the maximum image height. In the diagrams showing coma, Y denotes each image height. In the diagrams showing astigmatism, a solid line indicates a sagittal image plane and a broken line indicates a meridional image plane. The explanation regarding aberration graphs is the same in the following Examples. As is apparent from the respective graphs, the zoom lens system according to Example 1 shows superb optical performance as a result of good corrections to various aberrations as a whole.

EXAMPLE 2

Example 2 according to the present invention is explained below with reference to FIGS. 4 through 6. FIG. 4 is a diagram showing a lens construction of a zoom lens system according to Example 2 of the present invention together with the zooming trajectory of each lens group upon zooming from the wide-angle end state (W) to the telephoto end state (T).

In the zoom lens system shown in FIG. 4, the first lens group is composed of, in order from the object, a negative meniscus lens L1 having an aspherical surface facing to the object, and a positive meniscus lens L2 having a convex surface facing to the object. The second lens group G2 is composed of, in order from the object, an aperture stop S, a biconvex lens L3 having an aspherical surface facing to the object and a diffractive optical surface formed on the image side surface, and a cemented lens constructed by a biconvex lens L4 cemented with a biconcave lens L5. The third lens group G3 is composed of a biconvex lens L6 having an aspherical surface facing to the object.

By the way, the aperture stop S is arranged in the vicinity of the second lens group G2 between the first lens group G1 and the second lens group G2, and is moved with the second lens group G2 upon zooming. Optical filters F1 and F2 are positioned to the image side of the third lens group G3 in order from the object, and fixed similar to the third lens group G3.

Zooming from the wide-angle end state (W) to the telephoto end state (T) is carried out by moving each of the first lens group G1 and the second lens group G2. In Example 2, the first lens group G1 and the second lens group G2 are moved as shown by arrows A3 and A4, respectively, in FIG. 4. The third lens group G3 is fixed.

Various values associated with Example 2 of the present invention shown in FIG. 4 are listed in Table 3. Surface numbers 1 through 17 in Table 3 correspond to the reference number 1 through 17 in FIG. 4.

In Table 3, surface number 5 is the aperture stop S. The distance d4 (surface distance from the surface number 4 to the surface number 5) shown in surface number 4 and the distance d11 (surface distance from the surface number 11 to the surface number 12) shown in surface number 11 vary upon zooming. Similarly, the focal length f and f-number FNO of the zoom lens system also vary upon zooming. These values varying upon zooming are listed blow in the wide-angle end state (W) and the telephoto end state (T). Various values in accordance with conditional expressions (1) through (7) are listed below.

In Table 3, an aspherical surface is expressed with "*" attached to the right side of the surface number. In Example 2, surface numbers 7 and 8 are the diffractive optical surface Gf. Accordingly, the lens L3 in FIG. 4 corresponds to a lens (diffractive optical element) on which a diffractive optical surface Gf is formed. In surface numbers 7 and 8, various values of the diffractive optical surface Gf are shown by using the ultra-high index method.

TABLE 3

[Lens Data]

| | r | d | nd | ng | nC | nF |
|---|---|---|---|---|---|---|
| 1* | 700.00000 | 0.80000 | 1.834810 | 1.859530 | 1.828970 | 1.848510 |
| 2 | 6.05258 | 2.00000 | 1.000000 | | | |
| 3 | 8.40507 | 2.00000 | 1.805180 | 1.847290 | 1.796110 | 1.827770 |

TABLE 3-continued

| 4 | 18.20566 | d4 | 1.000000 | | | |
|---|---|---|---|---|---|---|
| 5 | | 1.00000 | Aperture Stop S | | | |
| 6* | 13.37863 | 2.00000 | 1.772500 | 1.791970 | 1.767800 | 1.783370 |
| 7 | −31.77566 | 0.00000 | 10001 | 7418.6853 | 11170.4255 | 8274.7311 |
| 8* | −31.77566 | 0.10000 | 1.000000 | | | |
| 9 | 8.68131 | 2.55000 | 1.834000 | 1.862780 | 1.827380 | 1.849820 |
| 10 | −5.31656 | 0.90000 | 1.698950 | 1.729410 | 1.692220 | 1.715420 |
| 11 | 4.13273 | d11 | 1.000000 | | | |
| 12* | 26.07609 | 2.00000 | 1.583130 | 1.595220 | 1.580150 | 1.589930 |
| 13 | −13.60898 | 0.60000 | 1.000000 | | | |
| 14 | ∞ | 2.30000 | 1.544370 | 1.553700 | 1.541900 | 1.549620 |
| 15 | ∞ | 0.32500 | 1.000000 | | | |
| 16 | ∞ | 0.60000 | 1.516330 | 1.526210 | 1.513860 | 1.521910 |
| 17 | ∞ | 1.48448 | 1.000000 | | | |

[Aspherical Surface Data]

Surface Number: 1

| $\kappa$ | $C_4$ | $C_6$ | $C_8$ | $C_{10}$ |
|---|---|---|---|---|
| 1.0000 | $2.57890 \times 10^{-4}$ | $-5.31000 \times 10^{-6}$ | $1.53620 \times 10^{-7}$ | $-1.28030 \times 10^{-9}$ |

Surface Number: 6

| $\kappa$ | $C_4$ | $C_6$ | $C_8$ | $C_{10}$ |
|---|---|---|---|---|
| −0.9643 | $-4.94590 \times 10^{-4}$ | $6.51820 \times 10^{-5}$ | $-1.37250 \times 10^{-5}$ | $7.94120 \times 10^{-7}$ |

Surface Number: 8

| $\kappa$ | $C_2$ | $C_4$ | $C_6$ | $C_8$ | $C_{10}$ |
|---|---|---|---|---|---|
| 1.0000 | $-1.50910 \times 10^{-7}$ | $-6.22640 \times 10^{-9}$ | $-5.16760 \times 10^{-10}$ | $6.05320 \times 10^{-11}$ | $-1.10240 \times 10^{-11}$ |

Surface Number: 12

| $\kappa$ | $C_4$ | $C_6$ | $C_8$ | $C_{10}$ |
|---|---|---|---|---|
| 16.8196 | $-4.51730 \times 10^{-4}$ | $1.52260 \times 10^{-5}$ | $-6.42040 \times 10^{-7}$ | $5.43720 \times 10^{-9}$ |

[Variable Distance upon Zooming]

| | Wide-angle (W) | Telephoto (T) |
|---|---|---|
| f | 5.97 | 16.88 |
| FNO | 3.00 | 5.41 |
| d4 | 13.59112 | 1.99322 |
| d11 | 5.62414 | 18.01814 |

[Values for Conditional Expressions]

C = 4.62
fw = 5.97393
L = 3.55
L2 = 5.55
ra = −31.77566
f1 = −13.93820
f2 = 11.04147
f3 = 15.62475
r1 = 700
r2 = 6.05258
(1) C/fw = 0.77336
(2) L/L2 = 0.63964
(3) |fw/ra| = 0.188003
(4) f3/fw = 2.615489
(5) (r1 + r2)/(r2 − r1) = −1.01744
(6) ΔN = 0.07355
(7) |f2/f1| = 0.792173

As shown above, in Example 2, all conditional expressions (1) through (7) are satisfied.

Figure 5:
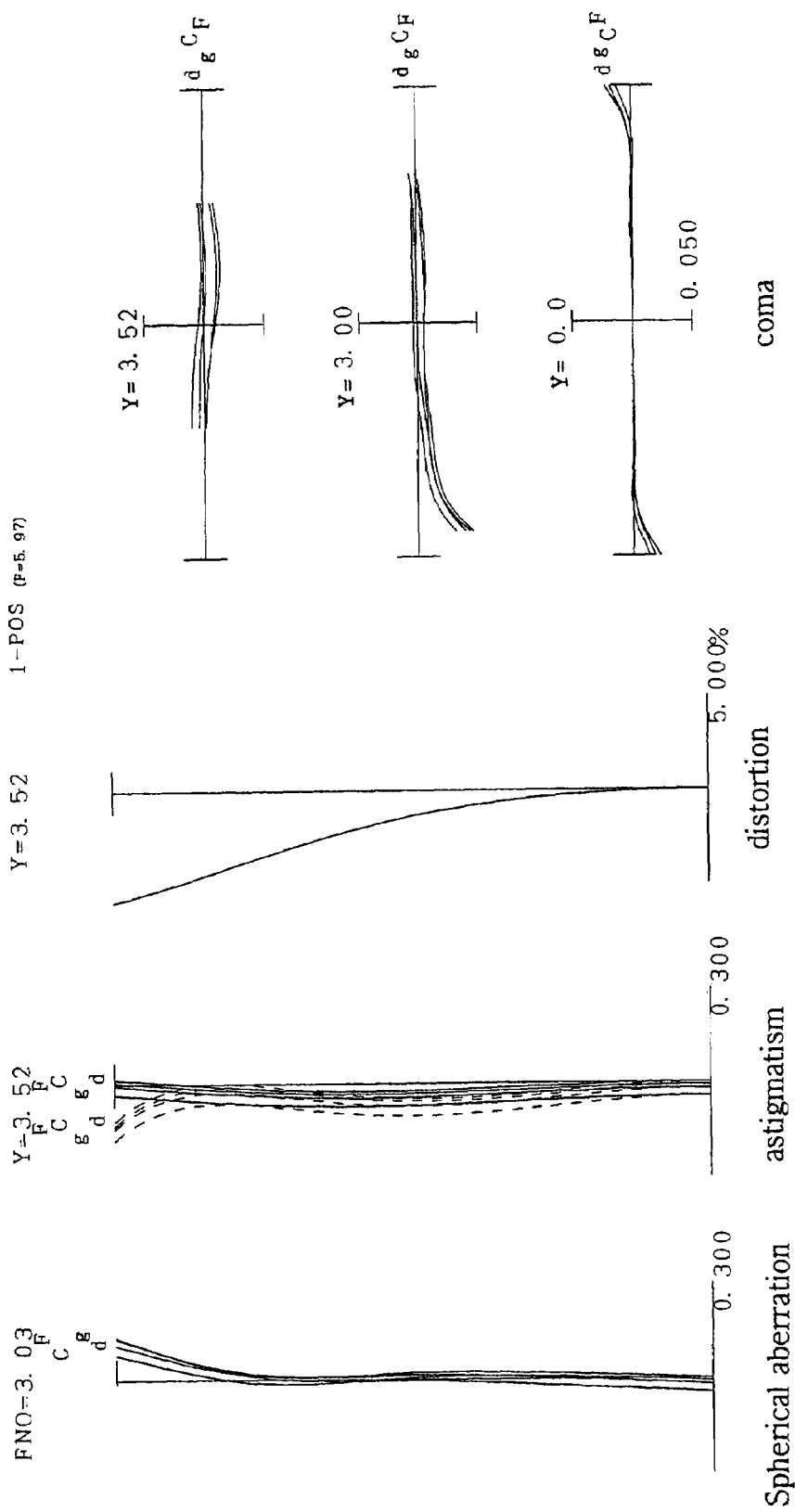
FIG. 5 is graphs showing various aberrations according to Example 2 of the present invention in the wide-angle end state.
Figure 6:
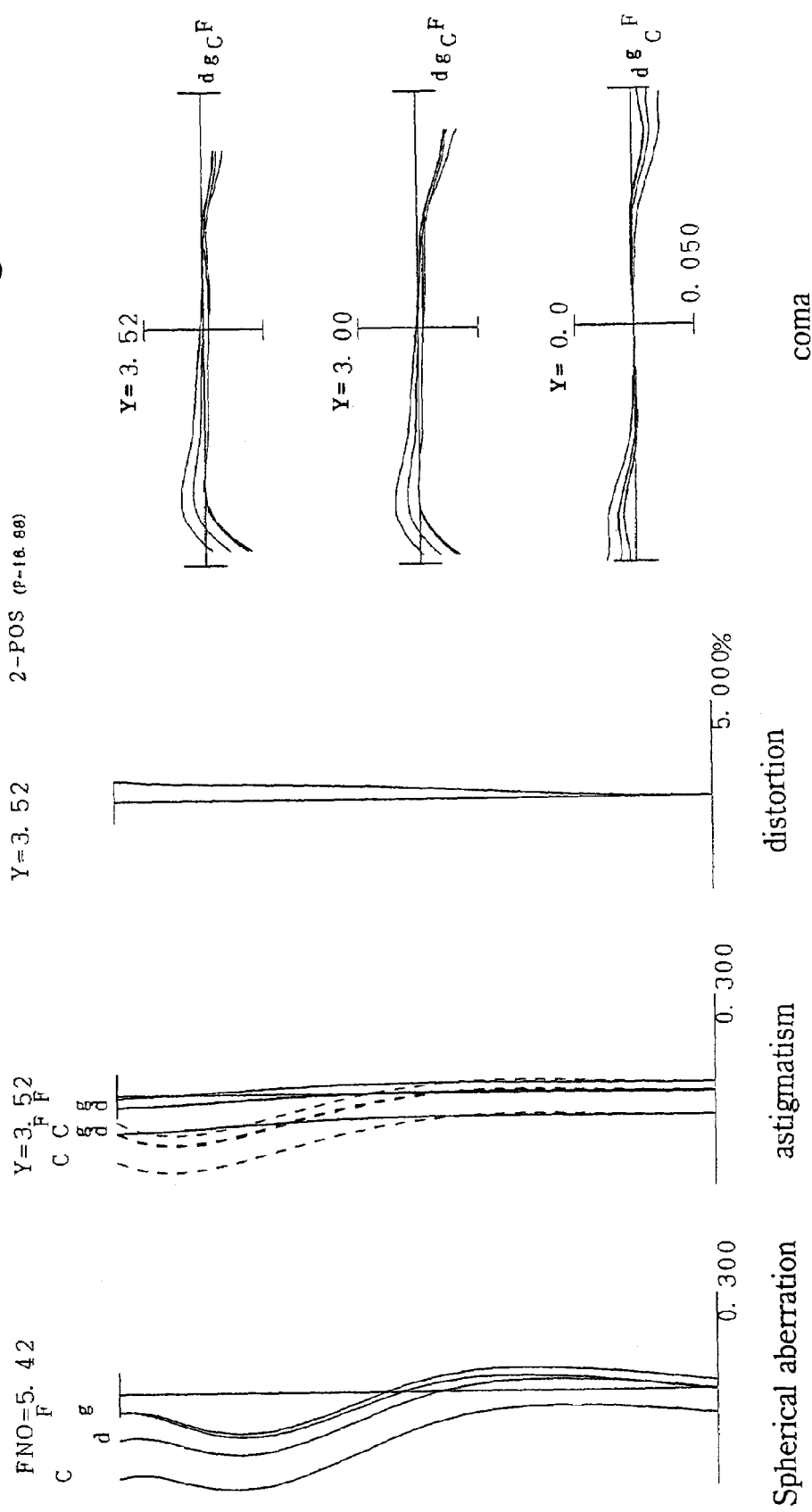
FIG. 6 is graphs showing various aberrations according to Example 2 of the present invention in the telephoto end state.

FIGS. 5 and 6 are graphs showing various aberrations according to Example 2. FIG. 5 shows aberrations in the wide-angle end state (W). FIG. 6 shows aberrations in the telephoto end state (T). As is apparent from the respective graphs, the zoom lens system according to Example 2 shows superb optical performance as a result of good corrections to various aberrations as a whole.

EXAMPLE 3

Example 3 according to the present invention is explained below with reference to FIGS. 7 through 9. FIG. 5 is a diagram showing a lens construction of a zoom lens system according to Example 3 of the present invention together with the zooming trajectory of each lens group upon zooming from the wide-angle end state (W) to the telephoto end state (T).

In the zoom lens system shown in FIG. 7, the first lens group is composed of, in order from the object, a negative meniscus lens L1 having an aspherical surface facing to the object, and a positive meniscus lens L2 having a convex surface facing to the object. The second lens group G2 is composed of, in order from the object, an aperture stop S, a cemented lens constructed by a biconvex lens L3 having an aspherical surface facing to the object cemented with a biconcave lens L4, and a cemented lens constructed by a negative meniscus lens L5 having a convex surface facing to the object cemented with a positive meniscus lens L6 having a diffractive optical surface Gf formed on the image side surface. The third lens group G3 is composed of, in order from the object, a biconvex lens L7 having an aspherical surface facing to the object, and a plano-convex lens L8 having a convex surface facing to the image. By the way, the aperture stop S is arranged between the first lens group G1 and the second lens group G2, and is fixed similar to the third lens group G3.

Zooming from the wide-angle end state (W) to the telephoto end state (T) is carried out by moving each of the first lens group G1 and the second lens group G2. In Example 3, the first lens group G1 and the second lens group G2 are moved as shown by arrows A5 and A6, respectively, in FIG. 7. The third lens group G3 is fixed.

Various values associated with Example 3 of the present invention shown in FIG. 7 are listed in Table 4. Surface numbers 1 through 16 in Table 4 correspond to the reference number 1 through 16 in FIG. 7.

In Table 4, surface number 5 is the aperture stop S. The distance d4 (surface distance from the surface number 4 to the surface number 5) shown in surface number 4, the distance d5 (surface distance from the surface number 5 to the surface number 6) shown in surface number 5, and the distance d12 (surface distance from the surface number 12 to the surface number 13) shown in surface number 12 vary upon zooming. Similarly, the focal length f and f-number FNO of the zoom lens system also vary upon zooming. These values varying upon zooming are listed blow in the wide-angle end state (W) and the telephoto end state (T). Various values in accordance with conditional expressions (1) through (7) are listed below.

In Table 4, an aspherical surface is expressed with "*" attached to the right side of the surface number. In Example 3, surface numbers 11 and 12 are the diffractive optical surface Gf. Accordingly, the lens L6 in FIG. 7 corresponds to a lens (diffractive optical element) on which a diffractive optical surface Gf is formed. In surface numbers 11 and 12, various values of the diffractive optical surface Gf are shown by using the ultra-high index method.

TABLE 4

[Lens Data]

| | r | d | nd | ng | nC | nF |
|---|---|---|---|---|---|---|
| 1 | 63.27518 | 1.00000 | 1.804000 | 1.825700 | 1.798820 | 1.816080 |
| 2* | 5.86614 | 1.37500 | 1.000000 | | | |
| 3 | 8.27052 | 1.80000 | 1.805180 | 1.847290 | 1.796110 | 1.827770 |
| 4 | 18.50044 | d4 | 1.000000 | | | |
| 5 | | d5 | Aperture Stop S | | | |
| 6* | 4.39627 | 2.20000 | 1.804000 | 1.825700 | 1.798820 | 1.816080 |
| 7 | −6.54377 | 0.75000 | 1.688930 | 1.717970 | 1.682500 | 1.704670 |
| 8 | 3.15882 | 0.60000 | 1.000000 | | | |
| 9 | 6.25657 | 0.50000 | 1.743200 | 1.762050 | 1.738650 | 1.753720 |
| 10 | 5.72154 | 0.90000 | 1.772500 | 1.791970 | 1.767800 | 1.783370 |
| 11 | 30.18608 | 0.00000 | 10001 | 7418.6853 | 11170.4255 | 8274.7311 |
| 12* | 30.18608 | d12 | 1.000000 | | | |
| 13* | 76.30423 | 1.30000 | 1.804000 | 1.825700 | 1.798820 | 1.816080 |
| 14 | −402.31705 | 0.60000 | 1.000000 | | | |
| 15 | ∞ | 3.00000 | 1.516330 | 1.526210 | 1.513860 | 1.521910 |
| 16 | −66.41146 | 2.54229 | 1.000000 | | | |

[Aspherical Surface Data]

| κ | $C_4$ | $C_6$ | $C_8$ | $C_{10}$ |
|---|---|---|---|---|

Surface Number: 1

| 1.0000 | $-1.08470 \times 10^{-4}$ | $-2.63700 \times 10^{-5}$ | $1.18050 \times 10^{-6}$ | $-3.62870 \times 10^{-8}$ |

Surface Number: 6

| 1.0000 | $-5.89130 \times 10^{-4}$ | $-6.53380 \times 10^{-5}$ | $6.47880 \times 10^{-6}$ | $-6.62230 \times 10^{-7}$ |

Surface Number: 12

| 1.0000 | $1.65160 \times 10^{-4}$ | $1.80860 \times 10^{-6}$ | $3.34900 \times 10^{-10}$ | $-2.32220 \times 10^{-10}$ |

TABLE 4-continued

Surface Number: 13

| 1.0000 | −6.45180 × 10$^{−4}$ | 7.34220 × 10$^{−6}$ | 9.53910 × 10$^{−6}$ | −5.65190 × 10$^{−7}$ |
|---|---|---|---|---|

[Variable Distance upon Zooming]

|  | Wide-angle (W) | Telephoto (T) |
|---|---|---|
| f | 5.56 | 10.48 |
| FNO | 2.919 | 3.962 |
| d4 | 9.86552 | 1.75642 |
| d5 | 4.31641 | 1.40331 |
| d12 | 1.89346 | 4.80653 |

[Values for Conditional Expressions]

C = 4.40
fw = 5.56205
L = 0
L2 = 4.95
ra = 30.18608
f1 = −16.32883
f2 = 8.80221
f3 = 50.03825
r1 = 63.27518
r2 = 5.86614
(1) C/fw = 0.791075
(2) L/L2 = 0
(3) |fw/ra| = 0.184259
(4) f3/fw = 8.996368
(5) (r1 + r2)/(r2 − r1) = −1.20436
(6) ΔN = 0.0608
(7) |f2/f1| = 0.539059

As shown above, in Example 3, all conditional expressions (1) through (7) are satisfied.

Figure 8:
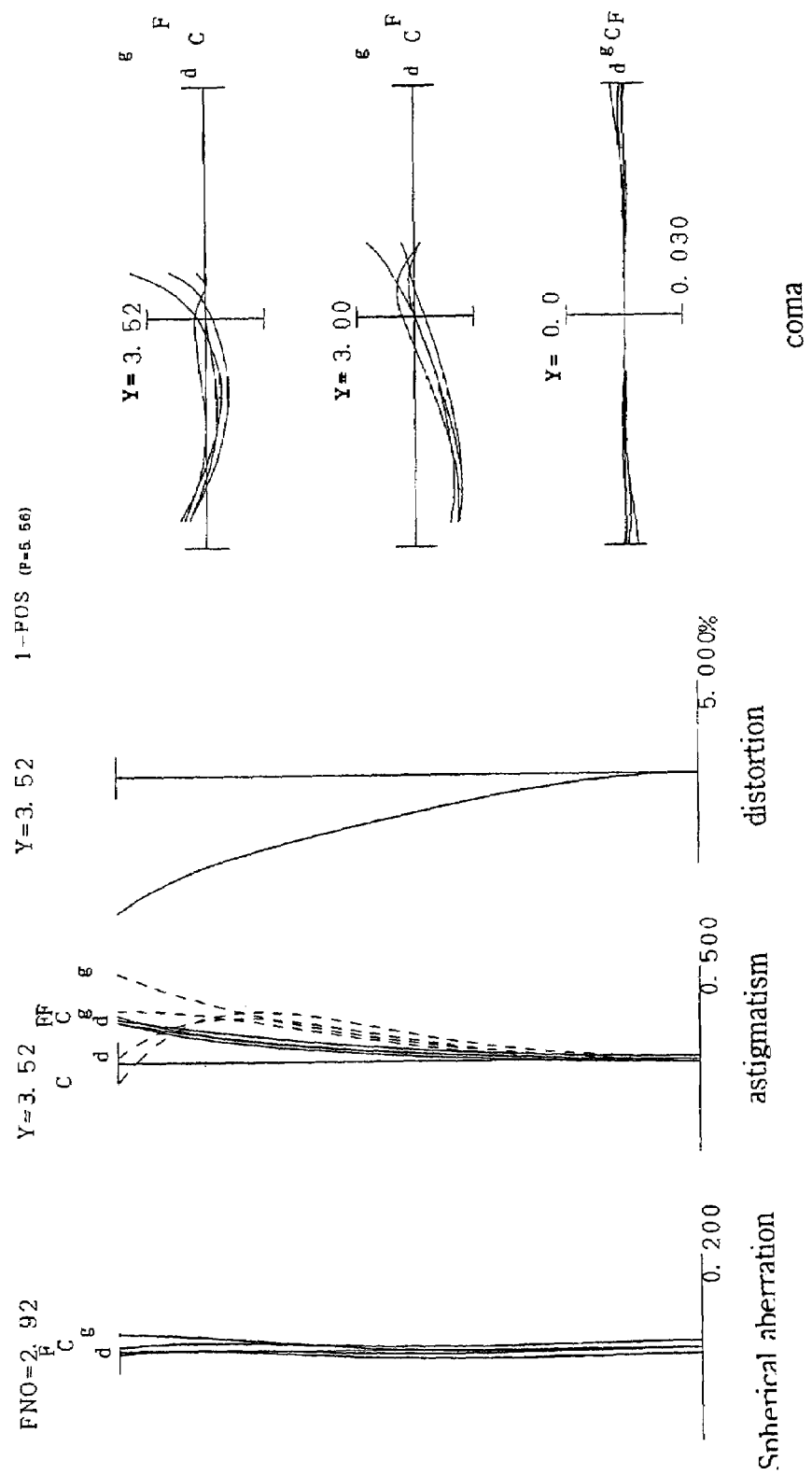
FIG. 8 is graphs showing various aberrations according to Example 2 of the present invention in the wide-angle end state.
Figure 9:
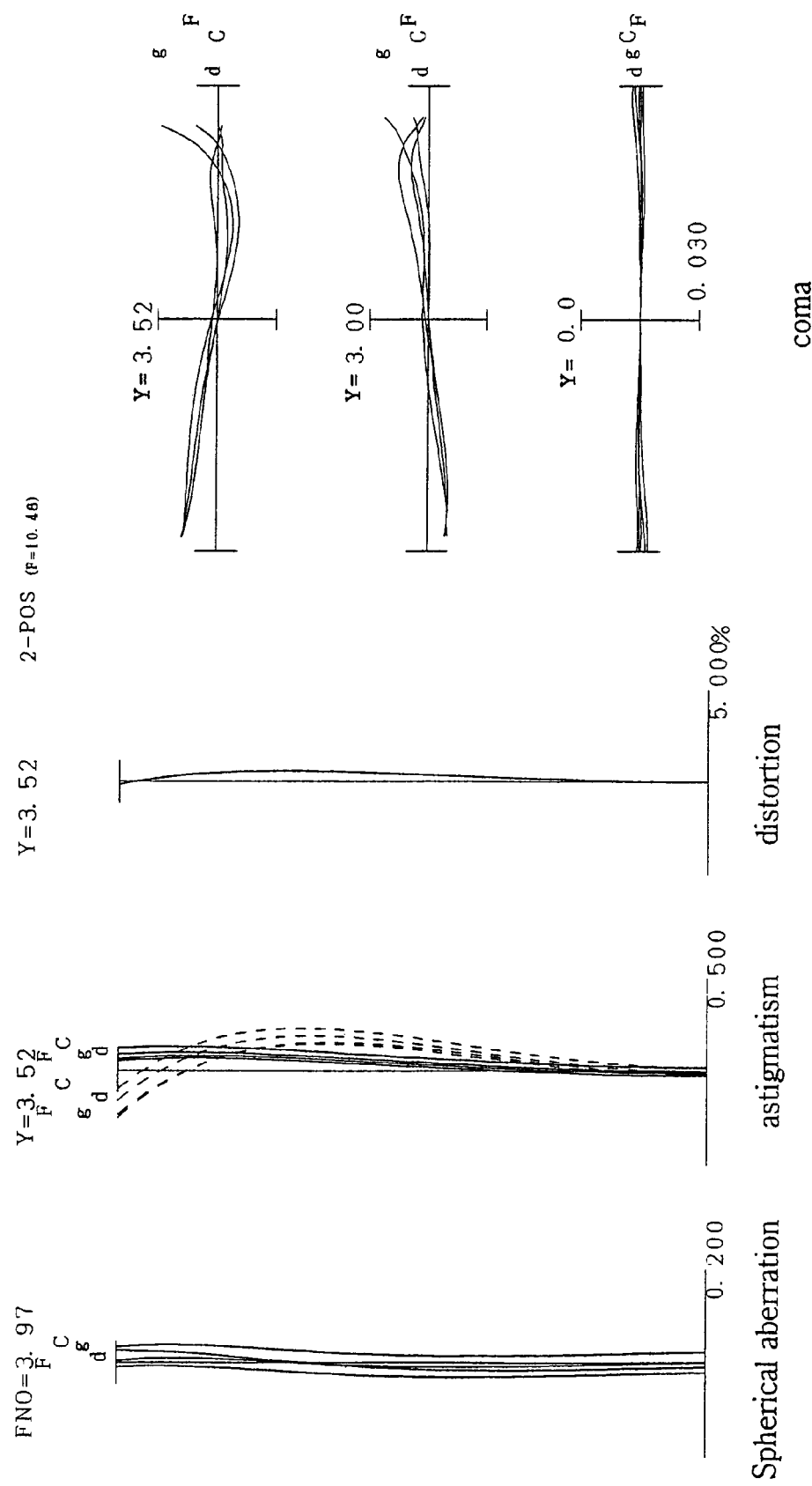
FIG. 9 is graphs showing various aberrations according to Example 2 of the present invention in the telephoto end state.

FIGS. 8 and 9 are graphs showing various aberrations according to Example 3. FIG. 8 shows aberrations in the wide-angle end state (W). FIG. 9 shows aberrations in the telephoto end state (T). As is apparent from the respective graphs, the zoom lens system according to Example 3 shows superb optical performance as a result of good corrections to various aberrations as a whole.

As described above, the present invention makes it possible to provide a zoom lens system suitable for video cameras, electronic still cameras and the like using a solid state imaging device having a zoom ratio of about 3, and in particular having compactness and high optical performance by using a diffractive optical element.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
    a first lens group; and
    a second lens group;
    wherein when the state of lens group positions varies from a wide-angle end state to a telephoto end state;
    the first lens group and the second lens group are moved such that
    a distance between the first lens group and the second lens group varies; and
    wherein the second lens group is composed of four lenses or less;
    the second lens group includes a diffractive optical surface formed on a lens surface except the most object side lens surface; and
    the following conditional expression is satisfied:

$0.2 < C/fw < 2.0$ where C denotes the effective diameter of the diffractive optical surface, and fw denotes the focal length of the zoom lens system in the wide-angle end state.

2. The zoom lens system according to claim 1, wherein the following conditional expression is satisfied:

$0 \leq L/L2 < 1.0$ where L denotes a distance along the optical axis between the most image side lens surface of the second lens group and the diffractive optical surface, and L2 denotes the total lens length of the second lens group.

3. The zoom lens system according to claim 2, wherein the diffractive optical surface is formed on a lens surface which faces the air, and the following conditional expression is satisfied:

$0 \leq |fw/ra| < 0.4$ where ra denotes a radius of curvature of the lens surface on which the diffractive optical surface is formed.

4. The zoom lens system according to claim 1, wherein the diffractive optical surface is formed on a lens surface which faces the air, and the following conditional expression is satisfied:

$0 \leq |fw/ra| < 0.4$ where ra denotes a radius of curvature of the lens surface on which the diffractive optical surface is formed.

5. The zoom lens system according to claim 1, wherein:
    the first lens group has negative refractive power; and
    the second lens group has positive refractive power.

6. The zoom lens system according to claim 5, wherein the following conditional expression is satisfied:

$$0 \leq L/L2 < 1.0$$

where L denotes a distance along the optical axis between the most image side lens surface of the second lens group and the diffractive optical surface, and L2 denotes the total lens length of the second lens group.

7. The zoom lens system according to claim 6, wherein the diffractive optical surface is formed on a lens surface which faces the air, and the following conditional expression is satisfied:

$$0 \leq |fw/ra| < 0.4$$

where ra denotes a radius of curvature of the lens surface on which the diffractive optical surface is formed.

8. The zoom lens system according to claim 5, wherein the diffractive optical surface is formed on a lens surface which faces the air, and the following conditional expression is satisfied:

$$0 \leq |fw/ra| < 0.4$$

where ra denotes a radius of curvature of the lens surface on which the diffractive optical surface is formed.

9. The zoom lens system according to claim 5, further comprising an aperture stop between the first lens group and the second lens group.

10. The zoom lens system according to claim 9, wherein the following conditional expression is satisfied:

$$0 \leq L/L2 < 1.0$$

where L denotes a distance along the optical axis between the most image side lens surface of the second lens group and the diffractive optical surface, and L2 denotes the total lens length of the second lens group.

11. The zoom lens system according to claim 10, wherein the diffractive optical surface is formed on a lens surface which faces the air, and the following conditional expression is satisfied:

$$0 \leq |fw/ra| < 0.4$$

where ra denotes a radius of curvature of the lens surface on which the diffractive optical surface is formed.

12. The zoom lens system according to claim 9, wherein the diffractive optical surface is formed on a lens surface which faces the air, and the following conditional expression is satisfied:

$$0 \leq |fw/ra| < 0.4$$

where ra denotes a radius of curvature of the lens surface on which the diffractive optical surface is formed.

13. The zoom lens system according to claim 1, wherein the zoom lens system comprising an aperture stop between the first lens group and the second lens group.

14. The zoom lens system according to claim 13, wherein the following conditional expression is satisfied:

$$0 \leq L/L2 < 1.0$$

where L denotes a distance along the optical axis between the most image side lens surface of the second lens group and the diffractive optical surface, and L2 denotes the total lens length of the second lens group.

15. The zoom lens system according to claim 14, wherein the diffractive optical surface is formed on a lens surface which faces the air, and the following conditional expression is satisfied:

$$0 \leq |fw/ra| < 0.4$$

where ra denotes a radius of curvature of the lens surface on which the diffractive optical surface is formed.

16. The zoom lens system according to claim 13, wherein the diffractive optical surface is formed on a lens surface which faces the air, and the following conditional expression is satisfied:

$$0 \leq |fw/ra| < 0.4$$

where ra denotes a radius of curvature of the lens surface on which the diffractive optical surface is formed.

17. A method of forming an image of an object and varying zoom ratio by a lens system that comprises a first lens group and a second lens group in order from the object, comprising the steps of:

providing the second lens group that is composed of four lenses or less and includes a diffractive optical surface formed on a lens surface except the most object side lens surface to satisfy the following conditional expression:

$$0.2 < C/fw < 2.0$$

where C denotes the effective diameter of the diffractive optical surface, and fw denotes a focal length of the lens system in the wide-angle end state; and varying zoom ratio by moving the first lens group and the second lens group and by varying a distance between the first lens group and the second lens group when the lens system moves from a wide-angle end state to a telephoto end state.

* * * * *